United States Patent [19]

Dehennau et al.

[11] Patent Number: 5,601,778
[45] Date of Patent: Feb. 11, 1997

[54] PROCESS FOR PRODUCING A RESIN FILM BASED ON A COPOLYMER OF ETHYLENE AND VINYL ACETATE

[75] Inventors: Claude Dehennau, Waterloo; Serge Dupont, Vilvoorde, both of Belgium; Martin Vonk, Enkhuizen, Netherlands

[73] Assignee: Solvay & Cie, Belgium

[21] Appl. No.: 477,631

[22] Filed: Jun. 7, 1995

Related U.S. Application Data

[62] Division of Ser. No. 673,814, Mar. 22, 1991, abandoned.

[30] Foreign Application Priority Data

Mar. 30, 1990 [BE] Belgium .................... 9000360

[51] Int. Cl.$^6$ .................................................. B29C 47/86
[52] U.S. Cl. ................... 264/519; 264/237; 264/327; 264/209.8; 264/564; 264/209.7; 425/379.1; 425/378.1; 425/380; 425/382.4; 425/326.1
[58] Field of Search ................... 264/237, 327, 264/209.8, 519, 564, 209.7; 425/379.1, 378.1, 380, 382.4, 326.1

[56] References Cited

U.S. PATENT DOCUMENTS

| | | | |
|---|---|---|---|
| 2,876,497 | 3/1959 | Alexander | 264/209.5 |
| 4,066,811 | 1/1978 | Naito et al. | 426/415 |
| 4,359,439 | 11/1982 | Fritsch et al. | 264/135 |

(List continued on next page.)

FOREIGN PATENT DOCUMENTS

| | | |
|---|---|---|
| 0068271 | 1/1983 | European Pat. Off. . |
| 0210108 | 1/1987 | European Pat. Off. . |
| 0364021 | 4/1990 | European Pat. Off. . |
| 88-13404 | 10/1988 | France . |
| 5063228 | 5/1980 | Japan . |

*Primary Examiner*—William Watkins
*Attorney, Agent, or Firm*—McDermott, Will & Emery

[57] ABSTRACT

The relationship between the average degree of roughness of the faces of rough appearance, expressed in microns, and the percentage by weight of units derived from vinyl acetate in the copolymer of which the film consists is greater than 0.019.

The film is extruded in the form of an extruded sleeve which is cooled in the die by a circulation of a coolant fluid whose temperature T satisfies the relationship:

$$-20°C. < T < \frac{Tc + 1 - Tm[aG^n + A(Ld/L)^2 + B(Ld/L)]}{1 - [aG^n + A(Ld/L)^2 + B(Ld/L)]}$$

in which
  Tc is the temperature at which the Napierian logarithm of the relationship between the length at break and the initial length of a test specimen of the copolymer has a value of 87% of its value at 180°
  Tm is the mean temperature of the copolymer as it leaves the die
  a is equal to 0.24
  G is given by the relationship $\rho \times C_p \times \vec{V} \times H^2 / \lambda \times L$
in which
  $\rho$ is the density of the copolymer
  Cp is the specific heat of the copolymer
  $\vec{V}$ is the mean flow velocity of the copolymer through the extrusion die
  H is the height of the gap between the core and the extrusion die
  $\lambda$ is the thermal conductivity of the copolymer
  L is the length of the cooling zone
  n is equal to 0.1688
  A is equal to −0.0148
  Ld is the distance between the end of the cooling zone and the end of the die
  B is equal to 0.2175.

The film is particularly suitable for the production of packaging bags especially for medical products.

5 Claims, 1 Drawing Sheet

U.S. PATENT DOCUMENTS

| | | | |
|---|---|---|---|
| 4,774,146 | 9/1988 | Dehennau et al. | 428/520 |
| 4,954,391 | 9/1990 | Kotuni et al. | 428/220 |
| 4,997,600 | 3/1991 | Okumura et al. | 264/22 |
| 4,997,616 | 3/1991 | Dehennau et al. | 264/519 |
| 5,151,234 | 9/1992 | Ishihara et al. | 264/176.1 |
| 5,248,472 | 9/1993 | Yoshikawa et al. | 264/519 |

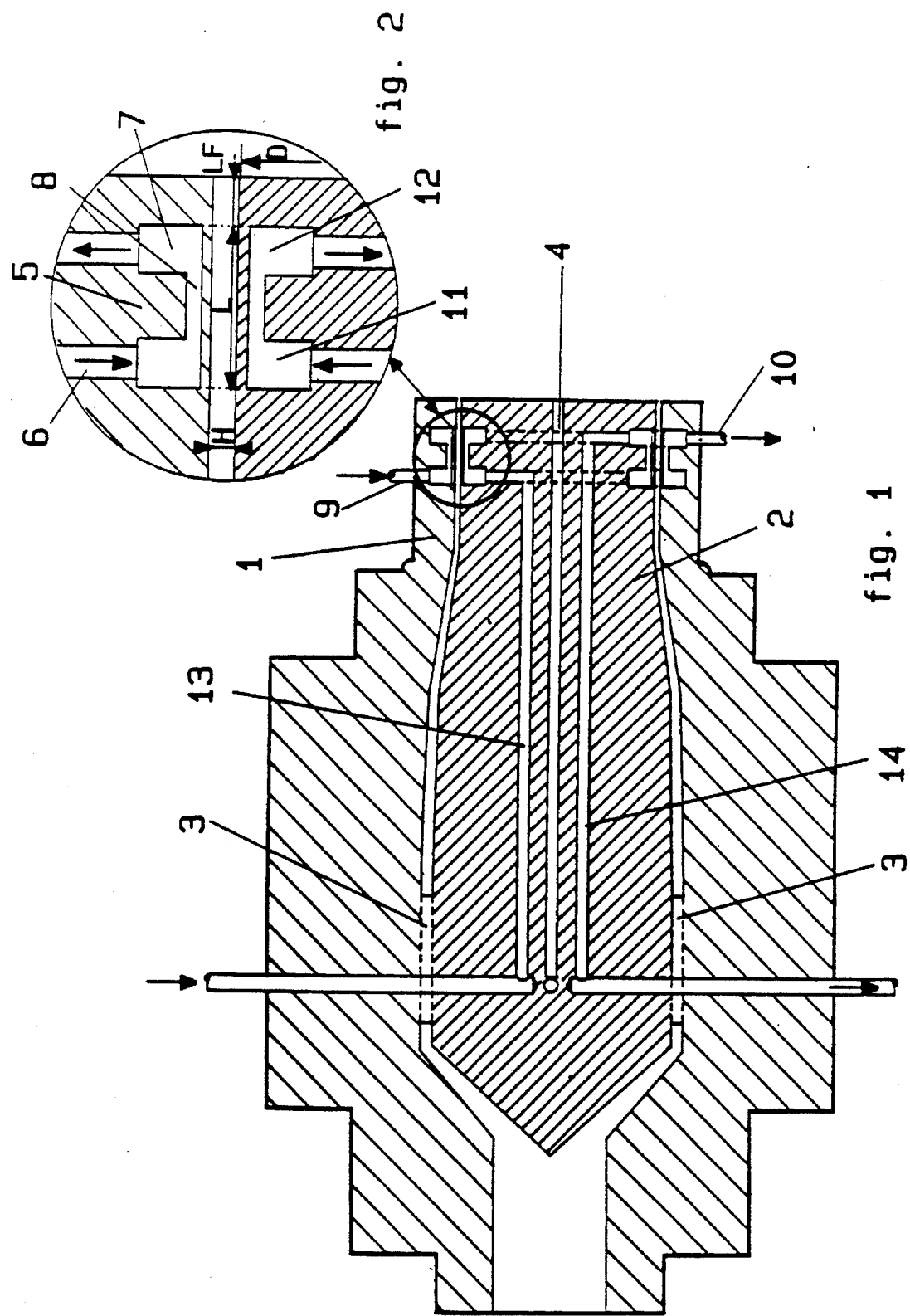

PROCESS FOR PRODUCING A RESIN FILM BASED ON A COPOLYMER OF ETHYLENE AND VINYL ACETATE

This is a divisional of U.S. patent application Ser. No. 07/673,814, filed Mar. 22, 1991 abandoned.

The present invention relates to a film of resin based on a copolymer of ethylene and vinyl acetate at least one of whose faces has a rough appearance and which is, as a result of this, particularly suitable for producing packaging bags which can be sterilised by gamma radiation, and to a process for producing such films.

DESCRIPTION OF THE PRIOR ART

It is well known, hitherto, to produce films of resin based on polyvinyl chloride at least one of whose faces has a rough appearance and which are also suitable for producing packaging bags. To produce such films the method generally employed is blow extrusion of a tubular sleeve which is then flattened and cut. In order to avoid problems due to an undesired adhesiveness between films in contact during the bag production operations it has already been proposed to produce these films so that at least one of their faces has a rough appearance, such an appearance being capable in particular of being obtained directly by refrigerating the extruded sleeve upstream of the exit orifice of the extrusion die.

Thus the Applicant Company has already described, in French Patent Application 88-13,404, a process which makes it possible to guarantee the production, using blow extrusion, of a sleeve of resin based on polyvinyl chloride, at least one of whose faces has a matt appearance.

To be sure, a sleeve of this type is suitable for producing packaging bags but it nevertheless has the disadvantage of imposing the use of resins containing plasticizers which may possibly migrate into the packaged products.

To overcome this disadvantage the Applicant Company has consequently envisaged replacing the resin based on polyvinyl chloride with a resin based on a copolymer of ethylene and vinyl acetate. It appears, in fact, that bags produced from such a resin are particularly suitable especially for packaging products for medical use, such as solutions of amino acids, of dextrose or of emulsions of lipids, of fatty vitamins, and the like.

However, the Applicant Company has found that resins based on a copolymer of ethylene and vinyl acetate do not readily lend themselves to the production of films at least one of whose faces has a sufficient roughness to permit their use without problems due to occurrences of undesired adhesiveness. In particular, when applying the process described in the abovementioned French Patent Application 88-13,404, it found that the sleeves and/or the films produced did not definitely have a satisfactory roughness.

The Applicant Company has nevertheless succeeded in producing such a film of resin based on a copolymer of ethylene and vinyl acetate.

SUMMARY OF THE INVENTION

The present invention consequently relates chiefly to a film based on a copolymer of ethylene and vinyl acetate at least one of whose faces has a rough appearance which makes it suitable for use without encountering problems of adhesiveness.

The invention therefore relates to a film of resin based on a copolymer of ethylene and vinyl acetate at least one of whose faces has a rough appearance, which is characterised in that the relationship between the average degree of roughness of the faces of rough appearance, expressed in microns and measured according to ISO standard R468-1966, and the percentage by weight of units derived from vinyl acetate in the copolymer of which the film consists is greater than 0.019.

The film in accordance with the invention may be either a single-layer film consisting solely of a copolymer of ethylene and vinyl acetate, or else a composite film produced, for example, by coextrusion and consisting of a plurality of layers of different plastics, the film having, in this case, at least one outer face produced from a copolymer of ethylene and vinyl acetate.

It has been found, in fact, that, in order to eliminate all adhesiveness problems, it is appropriate that the degree of roughness of the fill produced should be directly proportional to the percentage by weight of units derived from vinyl acetate in its constituent copolymer.

When this condition is obeyed it appears, in fact, that the fill is perfectly suitable for the production of bags.

The Applicant Company has furthermore found that, when the fill does not satisfy the abovementioned characteristic, not only do difficulties arise in the production and the use of the bags (welding of bags from reeled sleeves, fitting of inserts, bag filling, bag separation, and the like), but also the bags produced are tacky to the touch, sensitive to scratching and easily pick up dust.

In order to eliminate the abovementioned disadvantages with certainty, the Applicant Company prefers, furthermore, that the relationship specified above should be greater than 0.02.

By way of resin based on a copolymer of ethylene and vinyl acetate the Applicant Company prefers to use copolymers containing from 10 to 30 per cent by weight of units derived from vinyl acetate.

The average degree of roughness of the fills in accordance with the invention is determined according to ISO standard R468-1966 with the aid of an apparatus of the Perth-O-Meter type, which is based on an averaged measurement of the amplitude of the movements of a needle perpendicular to the surface to be characterised.

The present invention also relates, subsidiarily, to a process permitting the production of such fills.

The invention therefore also relates to a process for producing a film of resin based on a copolymer of ethylene and vinyl acetate, which is characterised in that the fill is produced in the form of a sleeve by blow extrusion and in that at least one of the faces of the die and of the film produced is cooled superficially upstream of the exit orifice of the extrusion die by a circulation of a coolant fluid whose temperature T is chosen so as to obey the relationship:

$$-20° C. < T < \frac{Tc - Tm[aG^n + A(Ld/L)^2 + B(Ld/L)]}{1 - [aG^n + A(Ld/L)^2 + B(Ld/L)]}$$

in which:

Tc is the temperature at which the Napierian logarithm of the relationship between the length at break and the initial length of a test specimen of the copolymer has a value of 87% of its value at 180° C., the elongation at break being measured by means of an elongational viscometer at a constant rate gradient of 5 s$^{-1}$ Tm is the mean temperature of the copolymer as it leaves the die a is equal to 0.24

G is given by the relationship $\rho \times C_p \times \vec{V} \times H^2 / \lambda \times L$
in which:

ρ is the density of the copolymer

Cp is the specific heat of the copolymer $\vec{V}$ is the mean flow velocity of the copolymer through the extrusion die H is the height of the gap between the core and the extrusion die λ is the thermal conductivity of the copolymer L is the length of the cooling zone n is equal to 0.1688

A is equal to −0.0148

Ld is the distance between the end of the cooling zone and the end of the die

B is equal to 0.2175.

In the formula given above, H, L and Ld are expressed in millimeters and $\vec{V}$ is expressed in cm/s.

The superficial cooling of one of both faces of the extruded sleeve is obtained by circulation of a coolant fluid, generally oil or a glycol, in the end of the die and/or of the core of the extrusion device. This cooling is preferably produced by a thin annular film of coolant fluid (thickness of the order of a millimeter) moving axially, that is to say along the direction of the extrusion axis, so as to ensure symmetrical cooling of the sleeve, resulting in a product of uniform roughness. The length of the cooled zone may vary between 3 and 30 mm and the distance between the end of the cooled zone and the end of the extrusion die may vary between 0 and 60 mm.

As a general rule it is appropriate that the distance between the beginning of the cooled zone and the exit orifice of the die should not exceed 70 mm, in order not to generate an unacceptable backpressure in the extrusion device upstream of the cooled zone.

The mean temperature Tm of the polymer as it leaves the die is easily determined, especially by means of temperature measurement probes, this temperature being generally between 160° and 200° C. and preferably between 170° and 190° C.

It has also been found that the haul-off speed applied to the sleeve as it leaves the extrusion die has a favourable effect on the appearance of roughness. It is consequently preferred that this haul-off speed should be preferably between 120 and 600% of the average speed of the resin at the die exit.

Finally, it has also been found that an abrupt change in the geometry of the resin flow channel at the end of the die and after the cooling zone, such as an abrupt reduction in the flow section of the extruded resin, can be found highly advantageous.

The process in accordance with the invention is, furthermore, illustrated and explained in greater detail by the description which is to follow, with a series of practical production trials.

A series of copolymers of ethylene and vinyl acetate containing from 14 to 28 per cent by weight of units derived from vinyl acetate were used in performing these trials.

A series of sleeves were extruded with these copolymers, by employing extrusion heads of the type already used in French Patent Application 88-013,404 and shown in FIGS. 1 and 2 of the attached drawings, in which:

BRIEF DESCRIPTION OF THE DRAWINGS

FIG. 1 is a diagrammatic and sectional view of an extrusion head

FIG. 2 is a partial, detailed and sectional view of the system for cooling the die of the extrusion head according to FIG. 1.

The extrusion head shown in FIGS. 1 and 2 comprises an annular die 1 and an internal core 2 supported by means of core-carrier fins 3. The core comprises a central channel 4, and this allows a fluid under pressure, generally air, to be blown into the extruded sleeve, as is usual in any blow extrusion plant.

The end of the core 2 and the end of the die 1 are equipped with an annular cooling system 5 comprising two chambers set apart axially 6 and 7, connected together by an annular channel 8. In the system for cooling the die, one of the chambers is connected to a delivery conduit 9 for a coolant fluid, in this case oil, and the other to a discharge conduit 10 for this fluid.

The two chambers (11, 12) of the system for cooling the core are also and respectively connected to delivery 13 and discharge 14 conduits for a coolant fluid, which pass through the core 2 and one of the core-carrier fins 3.

The delivery (9, 13) and discharge (10, 14) conduits for the coolant fluid are equipped with a thermal insulation set, not shown, as are the cooling systems, except on their side facing the extruded copolymer flow channel.

In addition, FIG. 2 also shows the length L of the cooling zone, the height H of the die gap in the cooled zone and the distance Ld between the die exit orifice and the downstream end of the cooled zone.

Table 1 below reproduces the data and the results of the trials carried out, with trials 1R to 6R not obeying the conditions imposed by the process in accordance with the invention and being given by way of comparison. In this table the various contents have been shown expressed as percentages by weight of units derived from vinyl acetate in the various copolymers on which experiments were performed, the various values attributed to the parameters L, Ld, H, V and Tm (mean temperature), the calculated values of $aG^n$ and of $A(Ld/L)^2+B(Ld/L)$, the permitted calculated maximum temperatures (Tmax) for the coolant fluid, for each trial, according to the process in accordance with the invention, the temperatures T of the coolant fluid which were used in the experiments, the degrees of roughness found during each trial and the value of the relationship between these degrees of roughness and the percentage by weight of units derived from vinyl acetate in the copolymer used.

As can be seen from an examination of Table 1, trials 1R to 6R, performed by employing a coolant fluid whose temperature exceeds the permitted calculated maximum temperature according to the process of the invention result in films which are excluded from the scope of the present invention and which, in fact, exhibit undesired adhesiveness properties.

In contrast, trials 7 to 16, performed within the scope of the process according to the invention result in films which form part of the scope of the invention and which are particularly suitable for the production of packaging bags.

TABLE 1

| TRIAL | % of vinyl acetate | L mm | Ld mm | H mm | $\vec{V}$ cm/s | Tm °C. | $aG^n$ | $A(Ld/L)^2 + B(Ld/L)$ | T °C. | T max. °C. | roughness microns | roughness % of vinyl acetate | observations |
|---|---|---|---|---|---|---|---|---|---|---|---|---|---|
| 1R | 18 | 4 | 0 | 0.7 | 7.46 | 180 | 0.4932 | 0 | 120 | 92 | 0.28 | 0.0155 | adhesiveness |
| 2R | 18 | 18 | 24 | 1 | 4.08 | 185 | 0.3898 | 0.2632 | 90 | 41 | 0.20 | 0.0111 | adhesiveness |
| 3R | 28 | 4 | 0 | 0.7 | 5.43 | 185 | 0.4676 | 0 | 110 | 82 | 0.46 | 0.0164 | adhesiveness |
| 4R | 14 | 4 | 0 | 0.7 | 5.93 | 185 | 0.4744 | 0 | 100 | 62 | 0.24 | 0.0171 | adhesiveness |
| 5R | 24 | 4 | 0 | 0.7 | 5.87 | 172 | 0.4736 | 0 | 90 | 54 | 0.23 | 0.0095 | adhesiveness |
| 6R | 24 | 4 | 0 | 0.7 | 5.87 | 172 | 0.4736 | 0 | 60 | 54 | 0.36 | 0.0150 | adhesiveness |
| 7 | 18 | 4 | 0 | 0.7 | 7.46 | 180 | 0.4932 | 0 | 90 | 92 | 0.39 | 0.0216 | no adhesiveness |
| 8 | 18 | 18 | 13.5 | 1 | 4.08 | 185 | 0.3898 | 0.1548 | 60 | 75 | .41 | 0.0227 | no adhesiveness |
| 9 | 18 | 18 | 24 | 1 | 4.08 | 185 | 0.3898 | 0.2632 | 30 | 41 | 0.46 | 0.0255 | no adhesiveness |
| 10 | 18 | 18 | 34 | 1 | 4.08 | 170 | 0.3898 | 0.3583 | 30 | 32 | 0.37 | 0.0205 | no adhesiveness |
| 11 | 28 | 4 | 0 | 0.7 | 5.43 | 185 | 0.4674 | 0 | 80 | 82 | 0.78 | 0.0278 | no adhesiveness |
| 12 | 28 | 18 | 13.5 | 0.7 | 7.72 | 185 | 0.3848 | 0.1548 | 60 | 66 | 0.89 | 0.0317 | no adhesiveness |
| 13 | 14 | 4 | 0 | 0.7 | 5.93 | 185 | 0.4744 | 0 | 60 | 62 | 0.36 | 0.0257 | no adhesiveness |
| 14 | 24 | 4 | 0 | 0.7 | 5.87 | 172 | 0.4736 | 0 | 30 | 54 | 0.81 | 0.0337 | no adhesiveness |
| 15 | 18 | 4 | 0 | 0.7 | 7.46 | 180 | 0.4932 | 0 | 31 | 92 | 0.91 | 0.0505 | no adhesiveness |
| 16 | 28 | 4 | 0 | 0.7 | 5.43 | 185 | 0.4674 | 0 | 30 | 82 | 1.57 | 0.0560 | no adhesiveness |

We claim:

1. A process for producing a resin film based on a copolymer of ethylene and vinyl acetate, comprising:

forming a sleeve of the resin film by blow extrusion through an extrusion die having a core and a cooling zone and superficially cooling at least one of the faces of the extrusion die and of the resin film produced by using a coolant fluid whose temperature T is chosen so as to obey the relationship:

$$-20°\text{C.} < T < \frac{Tc - Tm[aG^n + A(Ld/L)^2 + B(Ld/L)]}{1 - [aG^n + A(Ld/L)^2 + B(Ld/L)]}$$

in which:

Tc is the temperature at which the Napierian logarithm of the relationship between the length at break and the initial length of a test specimen of the copolymer has a value of 87% of its value at 180° C., the elongation at break being measured by means of an elongational viscometer at a constant pull rate gradient of 5 s$^{-1}$ Tm is the mean temperature of the copolymer as it leaves the die a is equal to 0.24

G is given by the relationship $\rho \times CP \times \vec{V} \times H^2 / \lambda \times L$ in which:

$\rho$ is the density of the copolymer

Cp is the specific heat of the copolymer $\vec{V}$ is the mean flow velocity of the copolymer through the extrusion die H is the height of the gap between the core and the extrusion die $\lambda$ is the thermal conductivity of the copolymer L is the length of the cooling zone n is equal to 0.1688

A is equal to −0.0148

Ld is the distance between the end of the cooling zone and the end of the die

B is equal to 0.2175.

2. Process according to claim 1, wherein the cooling is produced by a thin annular film of cooling fluid moving along the direction of the extrusion axis.

3. Process according to claim 1, wherein the extruded sleeve is subjected to hauling-off at a speed of between 120 and 600% of the average speed of the resin at the die exit.

4. Process according to claim 1, wherein the length of the cooled zone L varies between 3 and 30 mm and in that the distance between the end of the cooled zone and the end of the extrusion die varies between 0 and 60 mm.

5. Process according to claim 1, wherein at the end of the die the extruded copolymer is passed through an abruptly reduced flow section.

* * * * *